(No Model.)

F. GRINNELL.
AUTOMATIC FIRE EXTINGUISHER.

No. 269,197. Patented Dec. 19, 1882.

WITNESSES:
Wm. L. Copp.
H. J. Miller

INVENTOR
Fredrick Grinnell.
by J. A. Miller & Co
Atty's

UNITED STATES PATENT OFFICE.

FREDERICK GRINNELL, OF PROVIDENCE, RHODE ISLAND.

AUTOMATIC FIRE-EXTINGUISHER.

SPECIFICATION forming part of Letters Patent No. 269,197, dated December 19, 1882.

Application filed February 20, 1882. (No model.)

*To all whom it may concern:*

Be it known that I, FREDERICK GRINNELL, of the city and county of Providence, and State of Rhode Island, have invented a new and useful Improvement in Automatic Fire-Extinguishers; and I hereby declare that the following is a full, clear, and exact description of the same, reference being had to the accompanying drawings, forming part of this specification.

This invention has reference to an improvement in devices for distributing water, which water is released automatically by the action of the heat caused by the fire.

The invention consists in securing to the discharge-outlet a disk or deflector by means of solder, extending the said deflector beyond the outlet and providing it with projections, and also securing the said deflector so as to give to the same a limited movement when it is released by the action of heat and deflect the discharged water in all directions, as will be more fully set forth hereinafter, and more particularly pointed out in the claims.

Figure 1:
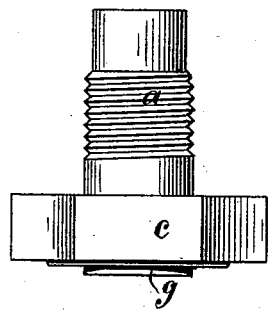
Figure 2:
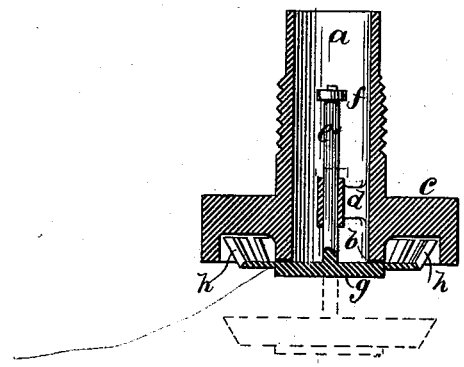
Figure 3:
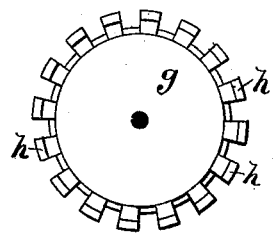
Figure 4:
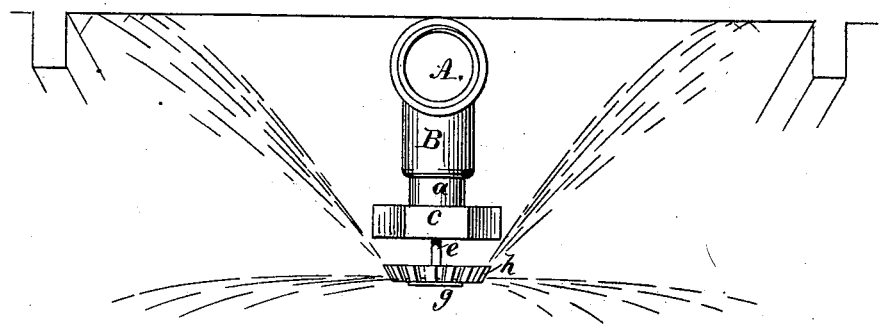

Figure 1 is a side view of my improved automatic fire-extinguisher. Fig. 2 is a sectional view of the same, showing the deflector-disk secured by solder to the outlet in solid lines and supported in front of the outlet to act as a deflector in broken lines. Fig. 3 is a top view of the deflector-disk, showing the flaring projections on the rim, by which a portion of the water is deflected and the intervals through which the rest of the water passes laterally. Fig. 4 is an end view of a supply-pipe, from which an automatic fire-extinguisher projects downward. The deflector is shown unsealed and supported below the outlet, so as to deflect the water partly upward and partly laterally over a large area.

In automatic fire-extinguishers simplicity of construction and the certainty of prompt action on the breaking out of a fire are necessary qualities; and the object of this invention is to so construct an automatic fire-extinguisher that, on the breaking out of a fire, its action will be prompt; that the same cannot be injured by dust in the room or impurities in the water, and will distribute the water on the ceiling of the room and over the fire, so as to extinguish the same promptly.

In the drawings, *a* is a nipple provided with a screw-thread, by which it can be secured to the fitting-piece B of the supply-pipe A.

*b* is a faced surface, forming the outlet, and to which the disk forming the seal is secured by a solder that will withstand the internal pressure in the pipes and will be affected by the heat caused by the breaking out of a fire sufficient to release the disk, and thus allow the water to be discharged.

*c* is an overhanging flange, formed near the nipple *a*.

*d* is a bracket placed within the nipple *a*, in which the rod *e*, provided at its upper end with the stop *f*, is free to move on a line with the axis of the nipple.

Secured to the end of the rod *e* is the disk *g*, provided at its edge with the projections *h h*, preferably placed flaring, so as to intercept the discharging water and cut it up into spray, forcing a portion of the same upward and the rest laterally, as is shown in Fig. 4. The disk *g* is secured to the edge or surface *b* by means of a solder fusible at a low temperature, so as to make a water-tight joint, and when this joint is weakened by heat the pressure of the water will break the joint, the disk will be forced outward or downward until the stop *f* rests on the bracket *d*, as is shown in broken lines in Fig. 2, and in view in Fig. 4, when the disk becomes a deflector and will distribute the water in a fine spray over a large area.

It will be seen that this automatic fire-extinguisher consists simply of an outlet and a seal in the form of a disk, which holds the water until a fire occurs, when the seal also forms the means for distributing the water. It will also be apparent that any amount of dust that may collect on this distributer or any amount of impurities that may be in the water will be freely washed out when the disk *g* is released. It cannot be clogged or otherwise interfered with, but will act promptly as soon as the soldered joint at *b* is sufficiently weakened to allow the internal pressure to break the seal.

I am aware that a deflector-plate for distributing the extinguishing-fluid radially, which plate also forms the cover for the outlet, closes the same when secured, and moves away from the outlet when released to resist the impact of the discharging-fluid and disperse the same, is not broadly new in an automatic fire-extinguisher, such a deflector plate forming part of the invention shown and described in Letters Patent No. 248,828, granted to me October 25, 1881.

Having thus described my invention, I claim as new and desire to secure by Letters Patent—

1. A distributer for fire-extinguishers, consisting, substantially as before set forth, of a valve-disk, $g$, having projections $h\,h$, said disk being adapted to be seated against an outlet or nipple to close the same, or to be held in front of said outlet when unseated.

2. The combination, substantially as before set forth, of the nipple $a$, the disk $g$, provided with projections $h\,h$, the fusible solder forming a water-tight joint between said nipple and disk, and the rod $e$, adapted to support the disk in front of the outlet when the joint is broken.

3. The combination, with the nipple $a$ and flange $c$, of the disk $g$, provided with the projections $h\,h$, constructed to be secured by solder to make a water-tight joint and held in front of the outlet when released, as described.

FREDERICK GRINNELL.

Witnesses:
H. J. MILLER,
J. A. MILLER, Jr.